United States Patent
Anfriani et al.

(10) Patent No.: US 11,263,367 B2
(45) Date of Patent: Mar. 1, 2022

(54) METHOD FOR SIMULATING THE DISTRIBUTION OF BLADES ON A TURBOMACHINE DISC

(71) Applicant: Safran Aircraft Engines, Paris (FR)

(72) Inventors: Alexandre Anfriani, Moissy-Cramayel (FR); Anthony Bernard Germain Lafitte, Moissy-Cramayel (FR); Julien Alexis Louis Ricordeau, Moissy-Cramayel (FR); Jean-Michel Roux, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 363 days.

(21) Appl. No.: 16/467,366

(22) PCT Filed: Dec. 7, 2017

(86) PCT No.: PCT/FR2017/053450
§ 371 (c)(1),
(2) Date: Jun. 6, 2019

(87) PCT Pub. No.: WO2018/104678
PCT Pub. Date: Jun. 14, 2018

(65) Prior Publication Data
US 2019/0332742 A1    Oct. 31, 2019

(30) Foreign Application Priority Data

Dec. 7, 2016 (FR) ...................................... 16 62048

(51) Int. Cl.
*G06F 30/17*   (2020.01)
*F01D 5/02*    (2006.01)

(52) U.S. Cl.
CPC ............. *G06F 30/17* (2020.01); *F01D 5/027* (2013.01)

(58) Field of Classification Search
CPC ...... G06F 30/17; G06F 30/00; G06F 2111/06; G06F 2119/18; F01D 5/027; F16F 15/32; G01M 1/36; Y02P 90/02; F04D 29/662
(Continued)

(56) References Cited

U.S. PATENT DOCUMENTS 6,109,871 A * 8/2000 Nelson .................. F04D 29/362
                                                    416/36
2006/0153684 A1* 7/2006 Henning .................. F01D 5/26
                                                    416/223 R

FOREIGN PATENT DOCUMENTS

FR       3 037 168 A1   12/2016

OTHER PUBLICATIONS

Mason, Andrew et al., "Solution Methods for the Balancing of Jet Turbines", 1997, Computers Op Res. vol. 24, No. 2, Elsevier Science Ltd. (Year: 1997).*

(Continued)

*Primary Examiner* — Cedric Johnson
(74) *Attorney, Agent, or Firm* — Oblon, McClelland, Maier & Neustadt, L.L.P.

(57) ABSTRACT

A method for simulating the distribution of blades on a turbomachine disc includes: providing blade configurations, each being associated with a blade and including at least one measurement of a balancing parameter measured on the associated blade; and searching for and selecting a bladed-disc distribution combining the configurations of blades supplied with positions on the disc, the bladed disc distribution encouraging the attainment of at least one criterion defined according to a predetermined cost function dependent on the balancing parameter measurements, and the searching and selecting being performed by successive iterations.

9 Claims, 6 Drawing Sheets

(58) Field of Classification Search
USPC .............................................................. 703/1
See application file for complete search history.

(56) References Cited

OTHER PUBLICATIONS

Kipourous, Timoleon et al., "Multi-Objective Optimization of Turbomachinery Blades Using Tabu Search", 2005, Springer-Verlag. ( Year: 2005).*
International Search Report dated Feb. 22, 2018 in PCT/FR2017/053450, (with English translation), 3 pages.
French Preliminary Search Report dated Oct. 25, 2017 in Patent Application No. FR 1662048 (with English translation of categories of cited documents), 21 pages.
Andrew Mason, et al. "Solution Methods for the Balancing of Jet Turbines" Computers and Operations Research, vol. 24, No. 2, XP055409625, Feb. 1, 1997, pp. 153-167.
E. Taillard, et al. "Robust Taboo Search for the Quadratic Assignment Problem" Parallel Computing, Elsevier, vol. 17, No. 4/5, XP000262054, Jul. 1, 1991, pp. 443-455.
Eric Taillard, "Metaheuristics for Hard Combinatorial Optimization Problems" Metaheuristics for Hard combinatorial Optimization © E. Taillard 2004, XP055417000, Nov. 1, 2004, 52 pages.
Eric D. Taillard, et al., "Popmusic—Partial Optimization Metaheuristic Under Special Intensification Conditions" Essays and Surveys in Metaheuris, XP008179677, Jan. 1, 2002, pp. 613-629.

* cited by examiner

METHOD FOR SIMULATING THE DISTRIBUTION OF BLADES ON A TURBOMACHINE DISC

GENERAL FIELD

The invention relates to a method for simulating the distribution of blades around a disc such as to form a bladed wheel for a turbomachine.

STATE OF THE ART

Blades intended to be mounted around a turbomachine disc are subjected to low dispersions during the manufacture thereof. These dispersions can be measured cold on each manufactured blade, that is to say, prior to their mounting on the disc and the rotation of the bladed disc obtained from this mounting. These dispersions can also be measured at operating temperatures on the different blades, that is to say, during the rotation of the bladed wheel.

Such dispersions are liable to make the bladed wheel unbalanced. The consequences of such an imbalance are numerous: vibrations of the whole engine, and/or generation of a significant acoustic noise during the rotation of the bladed wheel.

In order to distribute the blades in a balanced manner around a turbomachine disc, it has been proposed to implement an algorithm configured to search, from a set of possible blade distributions, for a distribution which optimises a predetermined cost function.

For n blades to be mounted around a disc, such a search is performed in a set of $(n-1)!/2$ blade distributions, considering that the disc is identical by rotation and symmetry. Such a search hence requires many computations if the number n is high. By way of example, for n=18, which is a standard blade number in a bladed disc for turbomachine, the set of distributions that can be selected comprises more than $2.10^{14}$ distributions.

In order to limit such a design load, the document "POPMUSIC—Partial Optimization Metaheuristic under Special Intensification Conditions", by Eric Taillard and published on Jan. 1, 2002, proposes to search for a blade distribution that optimises a predetermined cost function by means of a Tabu type algorithm.

The use of such a Tabu type algorithm allows to explore the space defined by the set of possible distributions in a relatively rapid manner.

The algorithm proposed in this document goes from one distribution to the other by permuting two blades.

However, this manner of exploring the set of possible distributions requires examining a substantial number of distributions when the cost function used depends on several blade balancing parameters. In other words, this algorithm converges towards an optimal solution checking the cost function in a relatively slow manner.

PRESENTATION OF THE INVENTION

A purpose of the invention is to distribute blades around a turbomachine disc in a balanced manner, by means of a limited computational load.

For this purpose, the present disclosure proposes a method for simulating blade distribution on a turbomachine disc such as to form a bladed wheel, the method comprising the steps of:
providing a plurality of blade configurations, each blade configuration being associated to a blade and comprising at least a balancing parameter measurement measured on the associated blade,
searching and selecting a bladed wheel distribution associating the blade configurations provided with disc positions,
the bladed wheel distribution promoting the attainment of at least one criterion defined according to a predetermined cost function depending on balancing parameter measurements, search and selection being performed by successive iterations. A current search and selection iteration comprises the steps of:
generating a plurality of neighbor distributions based on a reference distribution, said plurality comprising at least one first neighbor distribution generated according to a strategy promoting the attainment of a first set of predetermined resemblance criteria with the reference distribution and at least a second neighbor distribution generated according to another strategy promoting the attainment of a second set of predetermined resemblance criteria with the reference distribution,
selecting, from among neighbor distributions, a neighbor distribution promoting an optimization of the cost function as new reference distribution, wherein the cost function depends on several unbalances, each unbalance relating to a respective type of balancing parameter measurement, and wherein at least one imbalance is the subject of a thresholding by application of the cost function.

During the step of generating neighbor distributions, different resemblance criteria are used to generate these neighbors. These different resemblance criteria define different neighborhoods from the reference distribution.

The fact of using different resemblance criteria (and hence defining different neighborhoods for a reference distribution) allows defining several strategies for exploring blade distribution space.

A neighbor distribution can thus be relatively balanced from a first type of balancing parameter perspective, but relatively unbalanced from another type of balancing parameter perspective. Thus, the neighbors defined by the different sets of resemblance criteria do not allow to get closer in the same proportions of a hypothetical solution distribution checking the cost function. The selection step allows to perform arbitration between the different strategies provided by the different sets of used resemblance criteria, and hence converge more rapidly towards an optimal solution.

Furthermore, thresholding of at least one unbalance by application of the cost function has, as a result to make sure that, when one of the criteria is fulfilled, the performed search focuses on the other criteria.

The invention can also be completed by the following characteristics, taken alone or in any one of their technically feasible combinations.

The search and selection can be implemented by means of a Tabu algorithm, wherein at least one bladed wheel distribution having participated in at least one selection during a previous iteration is not processed as a neighbor distribution during the current iteration.

The Tabu type algorithm allows the space defined by the set of possible distributions to be explored in a rapid manner. In fact, during each search and selection iteration, some prior-tested distributions are not processed again.

As will be seen later on, a Tabu type algorithm used during the search ensures that the number of blade distributions tested during the search decreases.

At least one neighbor distribution can result from one or two blade position exchanges between blade configurations of the reference distribution.

One of the positions exchanged as part of one of the two exchanges and one of the positions exchanged as part of the other one of the two exchanges can be diametrically opposed.

The one at least neighbor distribution can result from one or two circular permutations of blade configurations applied to the reference distribution, each circular permutation being operated on a sub-assembly of blade configurations associated with consecutive positions around the disc in the reference distribution.

Each of the two circular permutations applied can represent a blade configuration displacement from an initial position to a destination position, the two initial positions being diametrically opposed in the reference distribution, and the two end positions being diametrically opposed in the neighbor distribution that is obtained.

It can be selectively generated during the current iteration, a number of neighbor distributions lower than the total number of first neighbor distributions of the reference distribution.

The method can comprise, for the reference distribution and for each neighbor distribution, the computation of at least one unbalance based on balancing parameter measurements of a same type contained in the distribution blade configurations, and based on positions associated to blade configurations in the distribution, the cost function depending on the unbalance.

The balancing parameter measurements are for example at least one of these types: blade pitch angle, axial moment of blade, radial moment of blade, and tangential moment of blade.

It is also proposed a method of manufacturing a bladed wheel for turbomachine from blades and a disc, the method comprising the steps of implementing the previous simulation method, and assembling blades on the disc according to the bladed wheel distribution selected by the simulation method.

It is further proposed a computer program product comprising program code instructions to execute the steps of the preceding simulation method, when this program is executed by a computing unit.

DESCRIPTION OF THE FIGURES

Other characteristics, purposes and advantages of the invention will become apparent from the following description, which is purely for illustration purposes and non limiting, and which should be read in light of the accompanying drawings on which.

On all the figures, similar elements bear identical references.

DETAILED DESCRIPTION OF THE INVENTION

Figure 1:
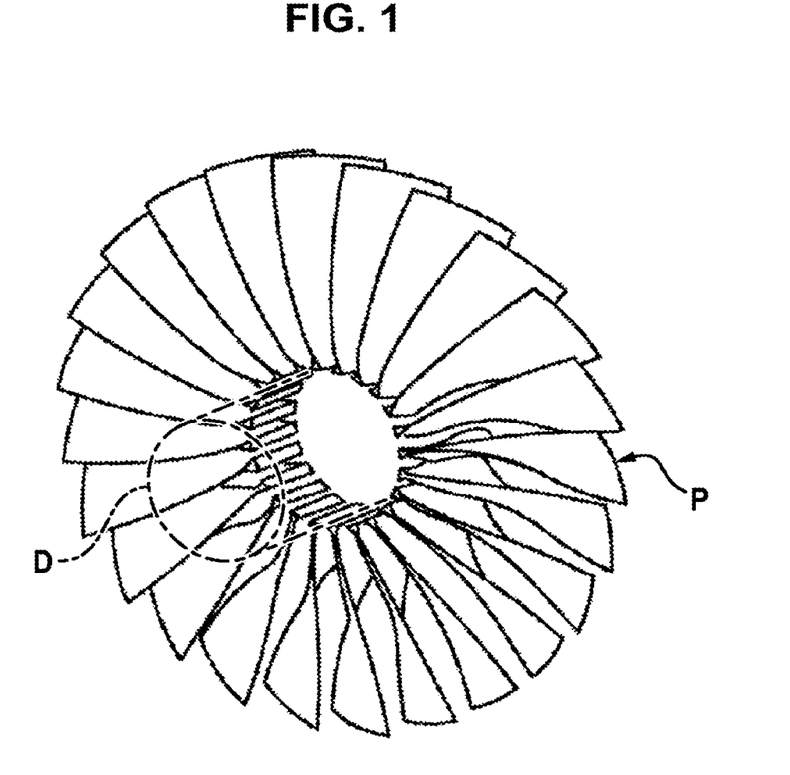
FIG. 1 represents a bladed wheel for turbomachine.

In reference to FIG. 1, a bladed wheel for turbomachine comprises a disc D and a plurality of blades P distributed on the disc around the axis thereof.

Figure 2A:
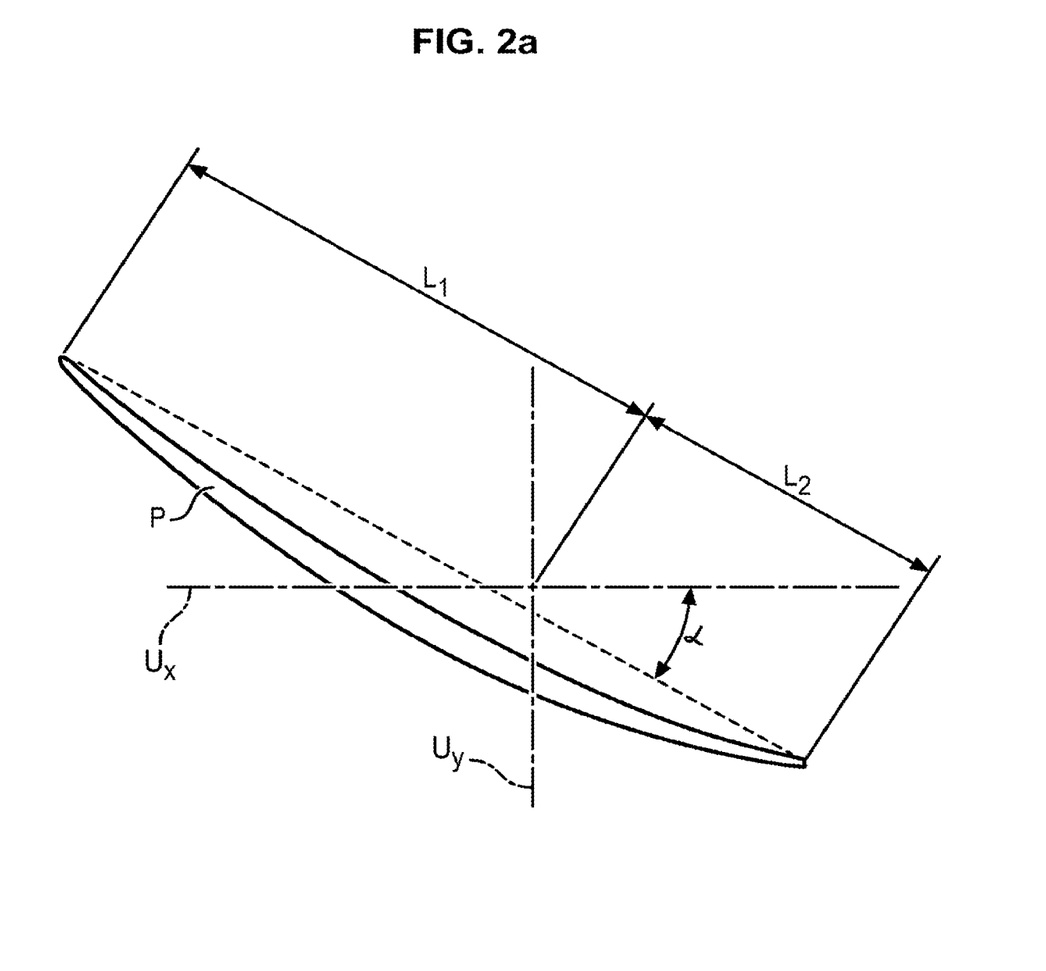
FIGS. 2a, 2b and 2c provide details of certain measurable parameters on a turbomachine blade.
Figure 2B:
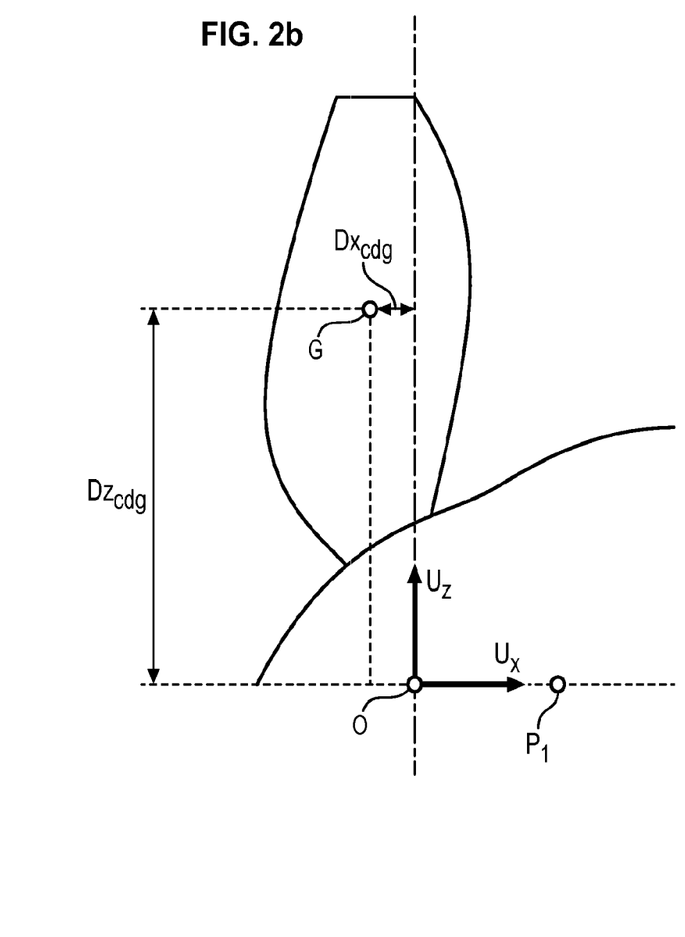
Figure 2C:
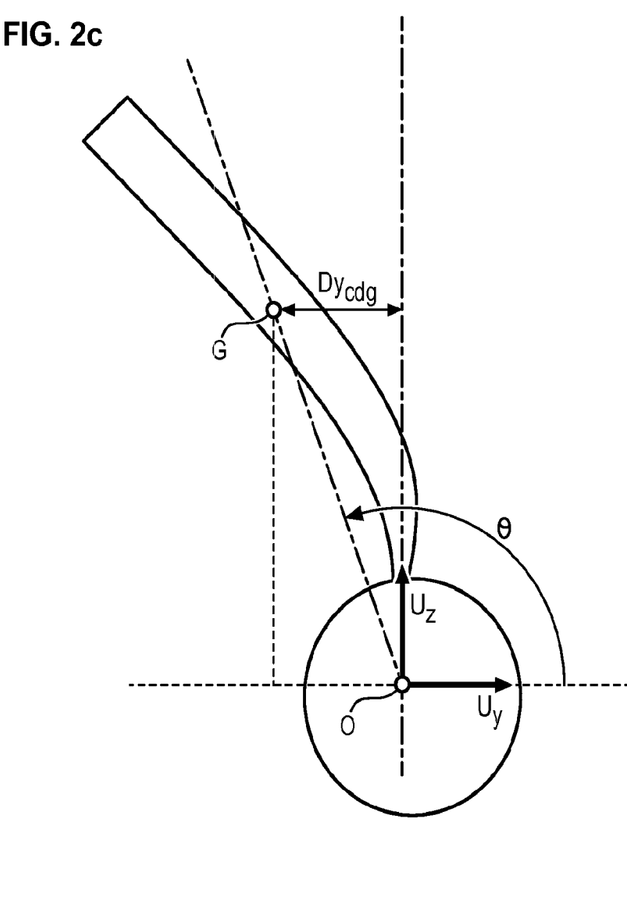

It has been illustrated on FIGS. 2a, 2b, 2c a blade P intended to be assembled on the disc D.

The blade P particularly exhibits the following intrinsic characteristics: an axial moment A, a tangential moment T, a radial moment R. Blade P also exhibits a pitch angle.

In reference to FIG. 2a, the pitch angle α can be described as the angle between the chord of the blade P and an axis of rotation $U_X$ of the disc, also called "motor axis" in the following.

In reference to FIGS. 2b and 2c, the blade P exhibits a center of gravity G. A static moment is the product of the mass of the blade P and one of its coordinates ($DX_{cdg}$, $Dy_{cdg}$, $DZ_{cdg}$) of the center of gravity G of the blade P taken in a direct reference frame (O, $U_X$, $U_Y$, $U_Z$) with $U_X$ being the motor axis, and O being the center of the frame on the motor axis.

For the radial moment R, the coordinate multiplied by the blade mass is that of the center of gravity of the blade taken on axis $U_Z$.

For the axial moment A, the coordinate multiplied by the blade mass is that of the center of gravity of the blade taken on axis $U_X$.

For the tangential moment T, the coordinate multiplied by the blade mass is that of the center of gravity of the blade taken on axis $U_Y$.

Figure 3:
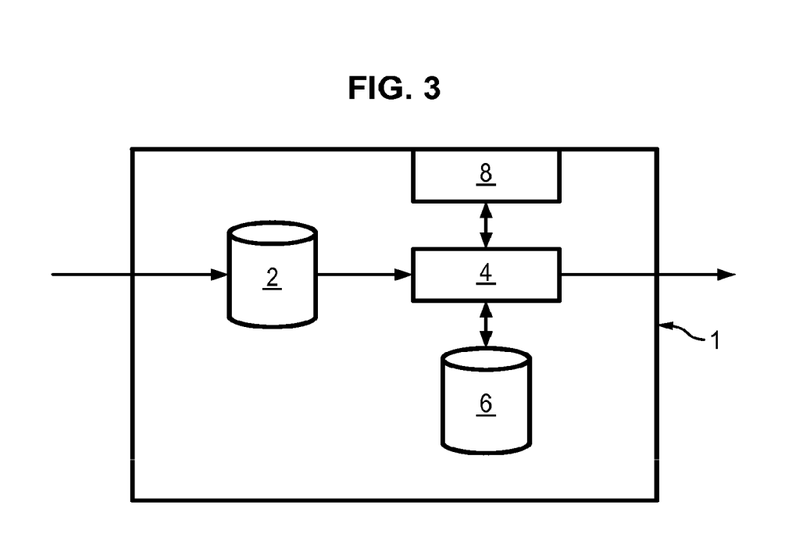
FIG. 3 schematically represents a blade distribution device according to an embodiment of the invention.

In reference to FIG. 3, a device 1 for distributing a plurality of blades P on the disc D to form a turbomachine bladed wheel, comprises a storage memory 2, a computing unit 4, a buffer memory 6 and a man-machine interface 8.

The storage memory 2 is configured to store a database containing data that represents blades (for example the moments and pitch in a cold state, the blade mass, blade pitch angle, blade height, in a non limiting manner) and positions of these blades on a disc D.

The computing unit 4 is configured to implement a search algorithm of Tabu type, which will be detailed hereinafter, based on the data stored in the memory 2. The computing unit 4 has reading and writing access to the storage memory 2.

The buffer memory 6 is also accessible in reading and writing by the computing unit 4. This buffer memory 6 is configured to store temporary data computed by the computing unit 4. Alternatively, memories 2 and 6 form one single and same memory.

The man-machine interface 8 comprises for example a display screen and entering means such as a keyboard that can be handled by an operator. The man-machine interface 8 gives this operator the possibility to modify algorithm execution parameters implemented by the computing unit 4.

Figure 4:
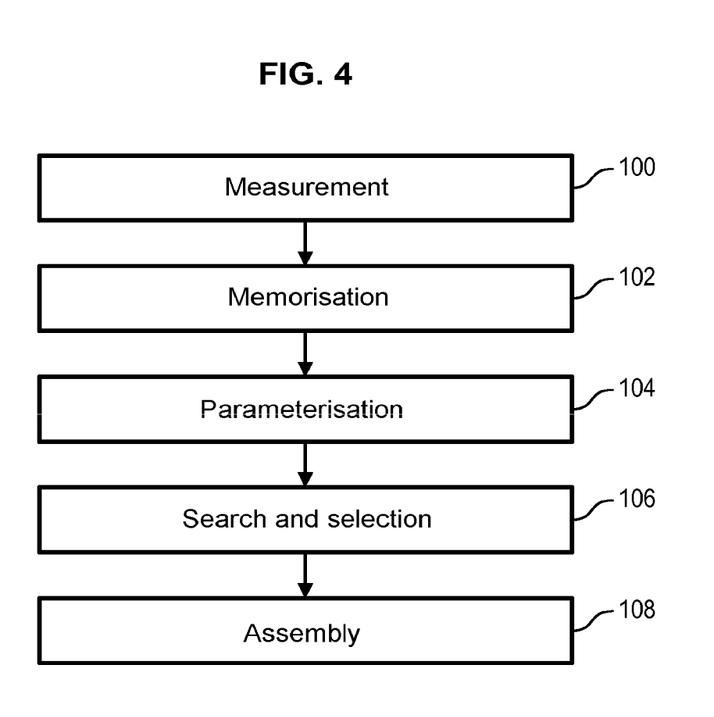
FIG. 4 is a logical diagram of steps of a blade distribution method according to an embodiment of the invention.

It will now be described in relation with FIG. 4 the steps of a distribution simulation method using the device 1.

It is considered that n individual blades P have been manufactured beforehand, as well as disc D, comprising n free places for blades, distributed around the axis thereof.

In a preliminary step 100, one or several balancing parameter measurements are carried out on each of the n blades. In the sequence, a balancing parameter is considered a physical magnitude that characterizes an individual blade.

It can be considered as balancing parameter measurement at least one of the following measurement types: pitch angle measurement, axial moment measurement, tangential moment measurement, radial moment measurement, by means of measurement methods known by the skilled person (for example using scales).

The measurement values are stored in a database of memory 2 during a memorization step 102.

The database is organized for example under the form of a table with several entries, each entry relating to one of the n considered blades. Each entry comprises one or several measurements performed on one same blade, the assembly formed by these measurements being in the sequence called "blade configuration". In addition to these measurements, an entry can comprise a unique blade identifier and/or a serial number.

| SN | Angle (°) | Radial (inch g) | Axial (inch g) | Tangential (inch g) | Posi_Instrum | Stationary? |
|---|---|---|---|---|---|---|
| KLJLKAER | −0.22 | 12345 | −2000 | 507 | 1 | Yes |
| FHFGHFGHDFH | −0.31 | 12500 | −2500 | 420 | 5 | No |
| FHGFH | −0.250 | 13000 | −1500 | 560 | 12 | No |
| HGHGGH | −0.02 | 12000 | −1800 | 670 | 6 | No |
| GHFG | −0.101 | 12700 | −1702 | 450 | 2 | Yes |
| FHGF | −0.200 | 11800 | −1504 | 590 | 10 | No |
| FHGF | −0.500 | 13500 | −1203 | 360 | 17 | No |
| ... | ... | ... | ... | ... | ... | ... |

In the table above, the lines represent respective entries of the database. The columns of the table contain, from left to right: a unique serial number SN which identifies a blade, a pitch angle value (with respect to a reference angle) measured on the blade, a radial moment value measured on the blade, an axial moment value measured on the blade, a tangential moment value measured on the blade, and information indicating if the blade should be positioned at an imposed or stationary position, or that this blade can on the contrary be freely placed at any of the n predetermined positions.

They are also initiated during the step 100 in the database, n position information, each piece of information defining the position around the axis of the disc D of a place for a respective blade. In the sequence, these position information will be simply called "blade positions", or even just "positions".

A blade position can be expressed as an angle, or an index i varying from 1 to n in a frame of reference in relation to the bladed wheel. In the sequence, it will be considered that the positions are indexes from which corresponding angles in the frame of reference of the bladed wheel can be determined.

At this stage of the method, the n blade positions and the n blade configurations are not yet associated.

In a search and selection step 106, the computing unit 4 generates a plurality of blade distributions on the bladed wheel, and searches and selects one of these bladed wheel distributions which optimizes a predetermined cost function. This cost function represents a balancing criterion and depends on the considered balancing parameters.

It is defined a bladed wheel distribution as an n-uplet of associations, each association associating one of the n blade configurations and one of the n blade positions. (n−1)!/2 different blade distributions can hence be theoretically generated during the step 106. As will be seen, a Tabu type algorithm used during the search ensures that the number of blade distributions tested throughout the search diminishes.

In an assembling step 108, the n individual blades are assembled on the disc D, at its n places, based on the distribution selected by the device 1 during the previous search and selection step 106.

Search and Selection by Means of a Tabu Type Algorithm

Figure 5:
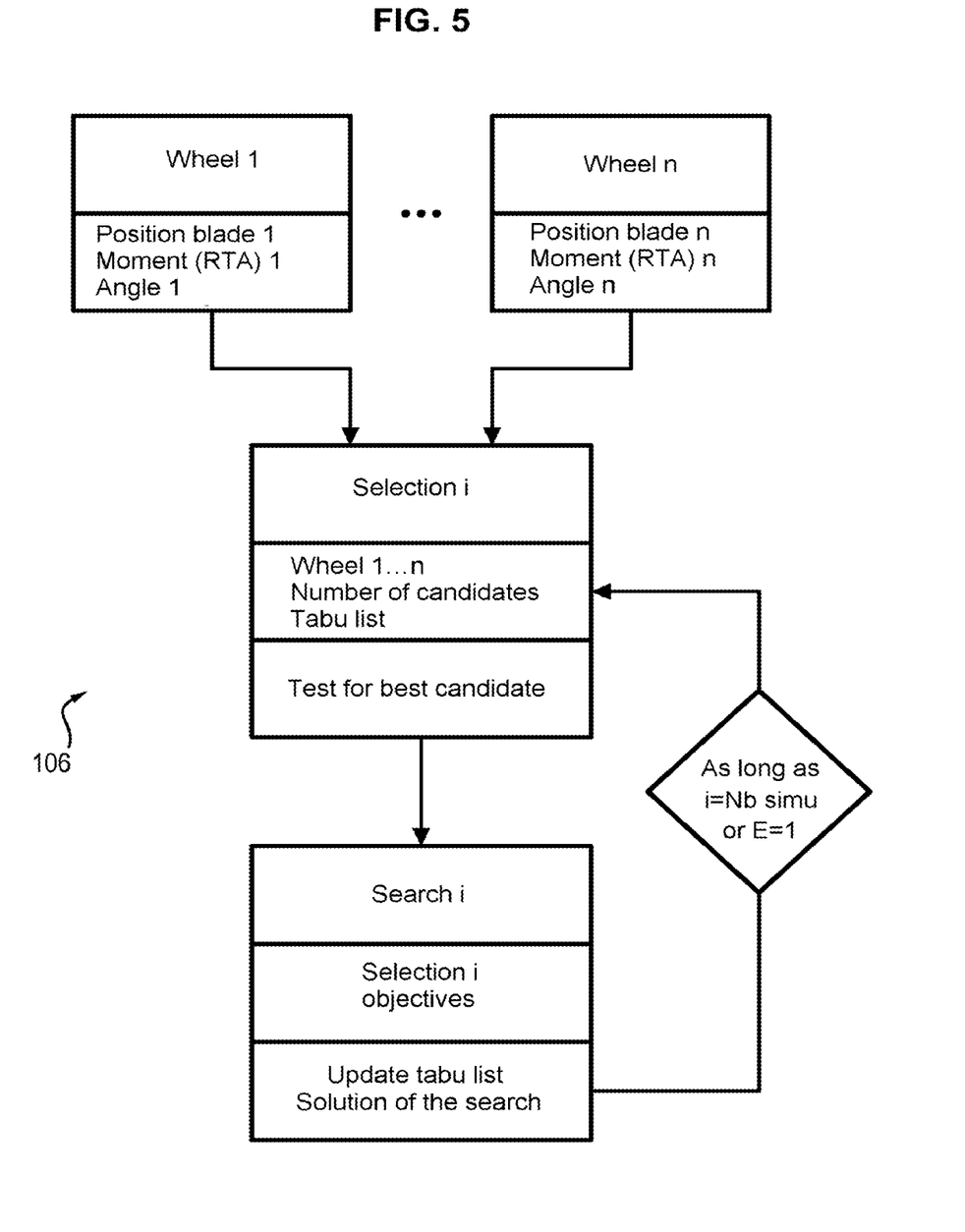
FIG. 5 is a logical diagram detailing a step represented on FIG. 4.

Now, the search and selection step 106 of the blade distribution to be used for assembling will be detailed in connection with FIG. 5.

As a preliminary step, two lists are assigned in the buffer memory 6: a list of candidates and a list called "tabu".

The search is implemented by means of a Tabu type algorithm, comprising successive iterations.

A current iteration comprises the following sub-steps.

The computing unit determines a reference bladed wheel distribution.

In the specific case of the first iteration, the reference distribution can be for example generated randomly and stored in the buffer memory 6 and/or in the memory 2 database. Alternatively, the first reference distribution is defined by the operator during a parameterizing step 104, via the man/machine interface 8.

In every iteration except for the first one, the reference distribution was generated during a previous iteration.

The computing unit 4 generates based on the reference distribution several neighbor distributions of the reference distribution, based on several predetermined resemblance criteria, each neighbor distribution relating to one of the predetermined resemblance criteria.

In other words, if q different resemblance criteria are used during this generating step, at least q neighbors defined according to different resemblance criteria are generated.

Each predetermined resemblance criteria corresponds to a permutation bijective mathematical function (composition of transpositions) between two distributions. In other words, a distribution that respects a predetermined resemblance criterion is a neighbor distribution as per this criterion.

For each of the used resemblance criteria, there is a total number of neighbor distributions that satisfy this resemblance criterion liable to be generated. However, in order to limit the design load of the method, only part of the possible neighbor distributions as per a given resemblance criterion is generated, their selection being random.

Neighbor distributions are added in the list of candidates by the buffer memory 6, after dumping of this candidate list.

The computing unit 4 computes the cost of each neighbor configuration, by applying the cost function to the balancing parameter measurements contained in the neighbor configuration.

More particularly, the computing unit 4 computes, for each neighbor distribution, at least one unbalance relating to one or several types of balancing parameter measurements. The cost function is applied to the unbalance of each neighbor distribution.

An unbalance corresponds to an eccentricity of the center of gravity of the entire disc. This center of gravity is computed by vector summation of all moments of each blade P.

Then, the computing unit 4 proceeds to select from the list of candidates, a distribution that best optimizes the cost function (that is to say, the distribution providing the best balancing among neighbor distributions). According to the type of considered function, the selected distribution will be the distribution which has a minimum or a maximum cost.

The selected neighbor distribution is hence considered as a new reference distribution.

The generated neighbor distributions are further stored in the "tabu" list, by the buffer memory 6.

These steps are then repeated in a following iteration, on the basis of this new reference distribution and so on and so forth in subsequent iterations, each new iteration considering a new reference distribution.

The algorithm ends when a predetermined exit criterion is met, for example a cost function value is attained by a reference distribution and/or when a number of iterations is attained.

In both cases, the optimal distribution that is chosen is the last reference distribution considered by the implemented Tabu type algorithm.

A specificity of the Tabu type algorithm used is that, during each iteration except for the first one, it is ensured that the bladed wheel distributions having participated in at least one election during a previous iteration are not processed as neighbor distributions during a following iteration.

This exclusion principle can be implemented in a current iteration by comparison, after the generating step of neighbor distributions, between the contents of the "tabu" list (updated during the immediately preceding iteration) and the contents of the candidate list. Every distribution found in both lists is hence deleted from the list of candidates.

Exclusion can be limited to the sole neighbors generated during the immediately preceding iteration, in order to limit the memory consumed by the tabu list.

Alternatively, the exclusion can focus on the neighbor distributions processed during K iterations preceding the current iteration. This alternative allows exploring the possible bladed wheel distribution space more rapidly.

This exclusion operation can further lead to increasing the value of the function (in a minimization issue): this is the case when all neighbor distributions have a higher cost than the reference distribution, hence forming a local minimum.

However, there is the risk that at the following step, one falls back to the minimum local to which one has escaped from. This is why heuristics needs memory: the mechanism consists in prohibiting (whence the name tabu) to return to the last positions having been explored.

The size of the Tabu list can be an algorithm execution parameter, liable to be changed by an operator via the man/machine interface 8.

Generating Neighbor Distributions

In an embodiment, four resemblance criteria are used for determining/generating the neighbor distributions.

Figure 6:
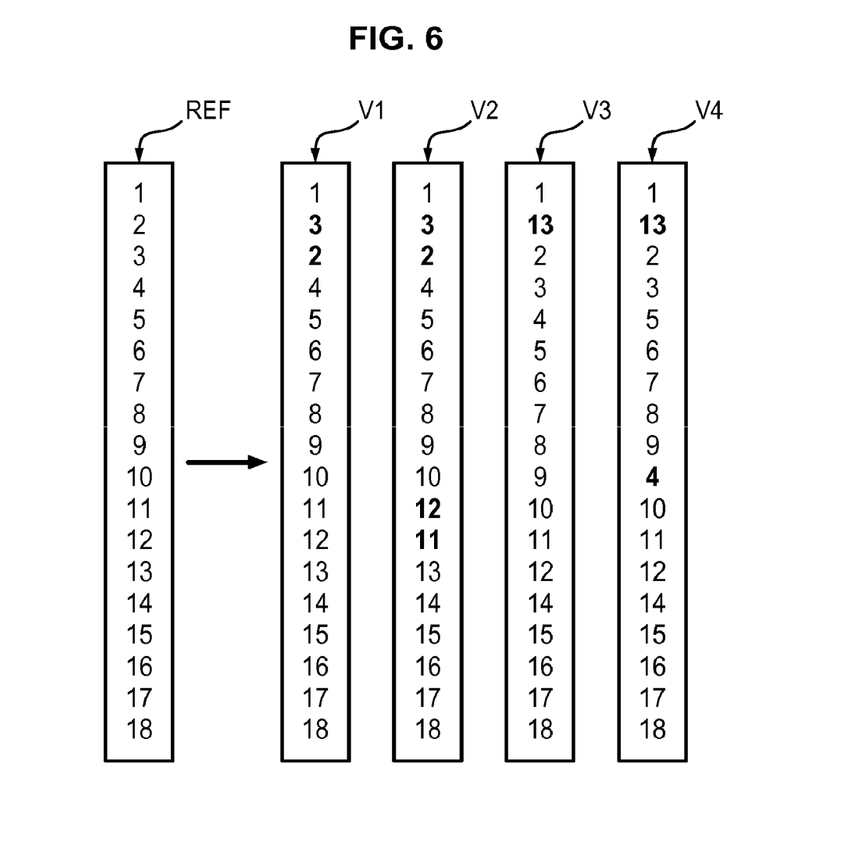
FIG. 6 schematically represents a bladed wheel distribution of reference and neighbor distributions of this reference distribution, generated during a blade distribution method according to an embodiment of the invention.

A neighbor distribution defined according to a first resemblance criterion is a bladed wheel distribution obtained after exchanging positions associated to two blade configurations in the reference distribution.

On FIG. 6, is represented an example of reference distribution REF and a neighbor distribution V1 generated according to this first resemblance criterion. Positions 2 and 3 of the distribution REF are exchanged to obtain distribution V1.

A neighbor distribution defined according to a second resemblance criterion is a bladed wheel distribution obtained after two position exchanges associated to two blade configurations in the reference distribution. Two pairs of positions are exchanged, for example distinct.

Furthermore, one of the positions exchanged as part of one of the two exchanges, and one of the positions exchanged as part of the other of the two exchanges can be diametrically opposed. By way of example, positions 2 and 3 of the distribution REF are exchanged, likewise, positions 12 and 11, to obtain the distribution V2, for a number of blades equal to 18.

The maximum allowed number of exchanges in keeping with the second criterion can be increased to a value higher than 2.

The positions defining an exchange can be adjacent (application of the first criterion or the second criterion).

A neighbor distribution defined according to a third resemblance criterion is a bladed wheel distribution resulting from a circular permutation of blade configurations applied to a sub-assembly of blade configurations associated to consecutive positions around the disc in the reference distribution.

Such a permutation virtually represents the displacement of a blade of a bladed wheel defined according to the reference distribution from a first position to a second position, and a shifting of the blades interposed between the first position and the second position.

By way of example, the distribution V3 illustrated on FIG. 6 is obtained by a circular permutation applied to the assembly [2, . . . 13] of the reference configuration REF. This circular permutation represents the displacement of a blade virtually positioned at position 13, to position 2.

A neighbor distribution according to a fourth resemblance criterion is a bladed wheel distribution resulting from two circular permutations in compliance with the third criterion.

Each of the two circular permutations applied representing a blade configuration displacement from an initial position to a destination position, it can be provided that the two initial positions be diametrically opposed in the reference distribution, and that the two end positions be diametrically opposed in the neighbor distribution that is obtained.

By way of example, the distribution V4 illustrated on FIG. 6 is obtained according to the fourth criterion.

The number of maximum circular permutations allowed in order to meet the fourth criterion can be increased to a value higher than 2.

During the step of generating neighbors, several of the four aforementioned criteria are used to generate at least one neighbor distribution of the reference distribution. In other words, if the four criteria are used, then a minimum of four neighbor distributions are generated during a same iteration.

The four different resemblance criteria detailed above define different neighborhoods of the reference distribution.

The fact of using different resemblance criteria (and hence defining different neighborhoods for a reference distribution) is advantageous in the case where the cost function depends on several types of balancing parameters.

In fact, the use of one single neighborhood, defined using a unique resemblance criterion could result in selecting a relatively balanced distribution from the point of view of a first type of balancing parameter, but relatively unbalanced from the point of view of another type of balancing parameter.

As a result, the fact of using these different criteria enables to explore the space of possible distributions according to different possible strategies.

The algorithm can be implemented with predetermined constraints that the blade distribution must comply with.

The stationary or blocked nature of one blade or the other, already mentioned, constitutes an example of constraint.

Furthermore, it can be chosen that at least one of the following constraint parameters be lower than a predetermined threshold in the distribution:

residual "Radial" unbalance: resultant of radial moments on the wheel residual "Radial+Tangential" unbalance: resultant of radial and tangential moments on the wheel residual "Radial generated by Axial torque in the plane of bearing 1" unbalance: resultant of radial components generated by the axial torque in the plane of bearing 1 on the wheel residual "Radial+Tangential+Radial generated by Axial torque in a plane of bearing 1" unbalance: resultant of radial, tangential and radial moments linked to the axial torque on the entire wheel Delta Radial moment max facing blades: maximum moment deviations between 2 facing blades taken on the wheel Delta Axial moment facing blades: maximum moment deviations between 2 facing blades taken on the wheel Delta Tangential moment max facing blades: maximum moment deviations between 2 facing blades taken on the wheel Residual "Pitch" unbalance: by assimilating the pitch of blades of the wheel to radial vectors, the radial resultant of pitches on the wheel is computed (pitch measured at a specific depth of cut)

Delta Pitch max blade to blade: maximum pitch deviations taken between 2 successive blades on the entire wheel (pitch measured at a specific depth of cut).

Finally, four constraint families can be studied:

Unbalances: on each wheel position, a blade characteristic (angle, moment, mass, . . . ) is represented by a vector. The unbalance is the length of the displacement caused by adding all the vectors associated with one or several blade characteristics.

Deltas of facing blade characteristics: on some wheel configurations, there is a blade facing each blade.

In this document, a pair of blades, shall designate 2 blades that are mounted facing each other. Giving a constraint on the pairs consists in looking at the difference in characteristics of paired blades.

Deltas of adjacent blade characteristics: the maximum difference of characteristics of a blade with its closest neighbors is a quantity of interest.

Blocked positions: the optimization algorithm will not test a wheel with blocked blades that are not in their place.

For example, "to displace" a blade, as per the third criteria, leads to displacing many blades from their initial position in the reference configuration, breaking the initial blade pairing in the reference configuration. This has for consequence to be incompatible with the constraint of having stationary blades (that is to say, blades that cannot be displaced) or, to a lesser extent constraints on diametrically opposed blade pairs on the wheel. If a certain number of blades lose their initial position (usually displaced by one space), their position with respect to their neighbor is hardly modified, and therefore this neighborhood improves the "delta adjacent" type criteria.

The table below summarizes the advantages and drawbacks of the different neighborhoods according to the sought balancing criterion.

| Neighborhood | Stationary blades | Delta adjacent criterion | Delta pair criterion | Unbalance |
|---|---|---|---|---|
| displacement 1 blade | -- | + | - | + |
| permutation 2 blades | ++ | - | - | + |
| displacement 1 pair | -- | + | + | + |
| permutation 2 pairs | ++ | - | + | + |

Selecting an "Optimal" Neighbor Distribution

The unbalance of a given neighbor configuration is computed based on n values of same type balancing parameter measurements (for example n pitch angles) contained in each of the n blade configurations, and based on n positions associated with n blade configurations of the neighbor distribution.

For example, the unbalance of a neighbor configuration relating to the pitch angles can be computed as the sum of n elementary vectors, each elementary vector of index i ranging from 1 to n is defined by means of the pitch angle measurement and is set in the blade configuration of index i, and the index position j. The orientation of the computed vector sum with respect to the virtual axis of the disc D represents a balancing degree of the neighbor configuration, from the point of view of the pitch angles. A vector sum collinear to this axis is representative of a perfectly balanced wheel.

Unbalances relating to a moment (tangential, axial or radial) can be computed in the same manner.

When the blade configurations contain more than one type of balancing parameter, several unbalances can be computed for each of the neighbor distributions, each unbalance relating to a type of balancing parameter. For example, for each of the neighbor distributions, an unbalance relating to the pitch angles, an unbalance relating to axial moments, an unbalance relating to tangential moments, etc., can be computed.

Other more complex unbalances, representing a combination of balancing parameter measurements can also be computed.

Cost Function

In one embodiment, the cost function depends on the following predetermined values:

C_ba: an axial unbalance reference

C_br: a radial unbalance reference

C_bt: a tangential unbalance reference

C_brt: a Radial+Tangential unbalance reference

C_brta: a Radial+Tangential+Axial unbalance reference

C_bang: an angular unbalance reference

C_adjacent_ang: adjacent angle deviation reference

C_paire_a: axial moment pair criteria reference

C_paire_t: tangential moment pair criteria reference

C_paire_r: radial moment pair criteria reference

C_paire_ang: a pitch angle pair criteria reference

These values are determined by an expert according to the sought vibration and acoustic thresholds.

The cost function further depends on the following parameters:

BA (Wheel): axial unbalance computed for the bladed wheel distribution Wheel

BR(Wheel): radial unbalance computed for the bladed wheel distribution Wheel

BT(Wheel): tangential unbalance computed for the bladed wheel distribution Wheel BRT(Wheel): radial+tangential unbalance computed for bladed wheel distribution Wheel BRTA(Wheel): axial+tangential+radial unbalance computed for the bladed wheel distribution Wheel BAng(Wheel): angular unbalance computed for the bladed wheel distribution Wheel Dadja_Ang(Wheel): maximum deviation of adjacent pitch angles found in the distribution Wheel.

Figure 7:
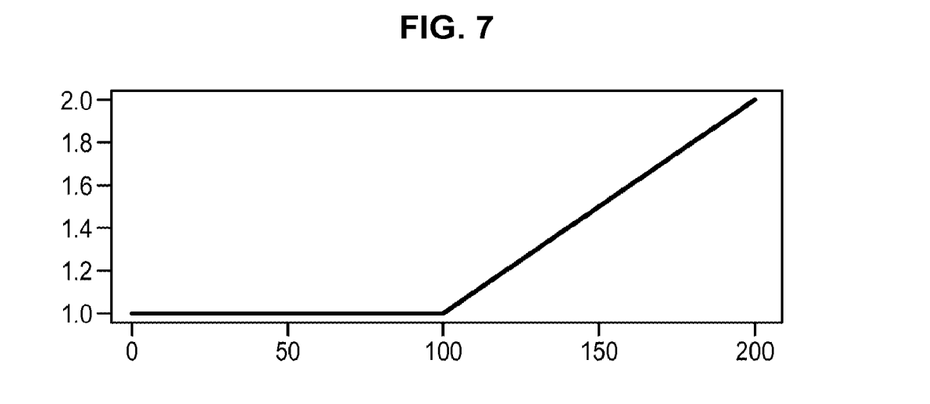
FIG. 7 represents a cost function according to an embodiment of the invention.

The cost function is constructed using the following terms, called "clearances":

E_ba(Wheel)=max(1, BA(Wheel)/C_ba)
E_br(Wheel)=max(1, BR(Wheel)/C_br)
E_bt(Wheel)=max(1, BT(Wheel)/C_bt)
E_brt(Wheel)=max(1, BRT(Wheel)/C_brt)
E_brta(Wheel)=max(1, BRTA(Wheel)/C_brta)
E_bang(Wheel)=max(1, Bang(Wheel)/C_bang)
E_delta_ang(Wheel)=max(1, Dadja_Ang (Wheel)/C_adjacent_ang)

These clearances have the form illustrated on FIG. 7. It is understood that each reference of the x-axis defines a balancing criterion.

Whatever the considered clearance, when the wheel respects the associated criterion, the clearance stagnates at 1. The point of this lower bound or thresholding, resides in the idea that as long as a criterion is attained, the algorithm focuses on the other criteria.

The cost function also depends on another parameter Nb_pair(Wheel), called "Pair delta number tangential moment off criterion for radial and tangential", and is defined as follows:

$$Nb\_pair(Wheel) = \frac{n}{2} - \sum_{i=1}^{n/2} \left( 1\{|M\_R_i - M\_R_{i+\frac{n}{2}}| < C\_pair\_r\} \times 1\{|M\_T_i - M\_T_{i+\frac{n}{2}}| < C\_pair\_t\} \times \right.$$
$$\left. 1\{|M\_A_i - M\_R_{i+\frac{n}{2}}| < C\_pair\_a\} \times 1\{|Ang_i - Ang_{i+\frac{n}{2}}| < C\_pair\_ang\} \right)$$

where:
1{ } is the indicator function,
M_Ri blade radial moment of index i
M_Ti blade tangential moment of index i
M_Ai blade axial moment of index i
Angi blade pitch angle of index i
n is the number of blades.

The cost function is also constructed by means of a clearance with respect to pairing criteria (C_pair_xxx, where xxx represents the variable of interest), of the form:

$$E\_pair = 2^{Nb\_pair(Wheel)}$$

The cost function on the wheel can thus be defined as follows:

Clearance(Wheel)=E_ba(Wheel)×E_br(Wheel)×E_bt (Wheel)×E_brt(Wheel)×E_brta(Wheel)×E_bang (Wheel)×E_delta_ang(Wheel)×E_pair(Wheel)

Or, alternatively:

Clearance(Wheel)=max(E_ba(Wheel);E_br(Wheel); E_bt(Wheel);E_brt(Wheel);E_brta(Wheel)× E_bang(Wheel))×E_delta_ang(Wheel)×E_pair (Wheel)

An indicator per family of criteria to be met, prevents "drowning out" a hardly represented family.

In a specific embodiment, only the references using the radial moment are used. In another embodiment, only the references using the moments are used. More generally, according to the values used for references C_b* and C_p*, the emphasis can be placed on one or several criteria in particular. The distribution method can be coded in a computer programme product comprising programme code instructions for executing its steps, when this programme is executed by the computing unit 4.

As a summary, it consists in using a search algorithm of "random walk" type in the space of possible (here, the Tabu algorithm, however, the use of a stochastic gradient or a genetic algorithm is also possible). Thus, it had to be imagined several elementary displacements compatible with the different objectives to attain at any moment of the search. It also had to be imagined a cost function (distance to objectives) promoting the attainment of all objectives, by introducing a thresholding when the objectives are attained.

The invention claimed is:

1. A computer-implemented method for simulating blade distribution on a turbomachine disc, the method comprising:
    providing a plurality of blade configurations, each blade configuration being associated to a blade and comprising at least a balancing parameter measurement measured on the associated blade; and
    searching and selecting a bladed wheel distribution associating the blade configurations provided with disc positions, the bladed wheel distribution promoting the attainment of at least one criterion defined according to a predetermined cost function depending on the balancing parameter measurements,
    wherein the searching and selecting steps are performed by successive iterations, a current iteration of the searching and selecting step comprising:
        generating a plurality of neighbor distributions based on a reference distribution, said plurality comprising at least one first neighbor distribution generated according to a strategy promoting the attainment of a first set of predetermined resemblance criteria with the reference distribution and at least a second distribution generated according to another strategy promoting the attainment of a second set of predetermined resemblance criteria with the reference distribution, and
        selecting, in the plurality of neighbor distributions, a neighbor distribution promoting an optimization of the cost function as new reference distribution,
    wherein the cost function depends on several unbalances, each unbalance relating to a respective type of balancing parameter measurement, and wherein at least one imbalance is the subject of a thresholding by application of the cost function, and
    wherein the method further comprises, for the reference distribution and for each neighbor distribution, computing of at least one unbalance based on balancing parameter measurements of a same type contained in the distribution blade configurations, and based on positions associated to blade configurations in the distribution, the cost function depending on the unbalance.

2. The method according to claim 1, wherein the searching and selecting are carried out with a Tabu type algorithm, and wherein at least one bladed wheel distribution having participated in at least one selecting during a previous iteration is not processed as a neighbor distribution during the current iteration.

3. The method according to claim 1, wherein at least one neighbor distribution results from one or two blade position exchanges between blade configurations of the reference distribution.

4. The method according to claim 3, wherein, one of the positions exchanged as part of one of the two exchanges and one of the positions exchanged as part of the other one of the two exchanges are diametrically opposed.

5. The method according to claim 1, wherein, at least one neighbor distribution results from one or two circular permutations of blade configurations applied to the reference distribution, each circular permutation being operated on a sub-assembly of blade configurations associated with consecutive positions around the disc in the reference distribution.

6. The method according to claim 5, wherein each of the two circular permutations applied represents a blade configuration displacement from an initial position to a destination position, the two initial positions being diametrically opposed in the reference distribution, and the two end positions being diametrically opposed in the neighbor distribution that is obtained.

7. The method according to claim 1, wherein the balancing parameter measurements are at least of one of these types: blade pitch angle, axial moment of blade, radial moment of blade, and tangential moment of blade.

8. A method of manufacturing a bladed wheel for turbomachine from blades and a disc, the method comprising;
    implementing a simulation method, according to claim 1; and
    assembling blades on the disc based on a bladed wheel distribution selected by the simulation method.

9. A non-transitory computer readable medium comprising program code instructions to execute the steps of the simulation method according to claim 1, when said program code instructions are executed by a computing unit.

* * * * *